US006986554B2

(12) United States Patent
Versteyhe et al.

(10) Patent No.: US 6,986,554 B2
(45) Date of Patent: Jan. 17, 2006

(54) POWER DISSIPATION MANAGEMENT SYSTEM

(75) Inventors: Mark RJ Versteyhe, Oostkamp (BE); Ivana A. Duskunovic, Ghent (BE); Steven Dumoulin, Roeselare (BE); Christophe Thomas, Drongen (BE)

(73) Assignee: Spicer Off-Highway Belgium, N.V., Bruges (BE)

( * ) Notice: Subject to any disclaimer, the term of this patent is extended or adjusted under 35 U.S.C. 154(b) by 0 days.

(21) Appl. No.: 10/677,888

(22) Filed: Oct. 2, 2003

(65) Prior Publication Data

US 2005/0006953 A1    Jan. 13, 2005

Related U.S. Application Data

(60) Provisional application No. 60/427,812, filed on Nov. 20, 2002.

(51) Int. Cl.
*B60T 13/74* (2006.01)
(52) U.S. Cl. ............... 303/2; 303/3; 303/20; 188/71.6; 188/264 F; 701/48; 192/13 R; 477/72
(58) Field of Classification Search ............... 188/382, 188/274, 290–296, 264, 71.6; 701/48, 95, 701/67, 51; 192/12 R, 12 A, 113.1, 113.2, 192/13 R; 303/2–3, 15, 20; 477/72, 76, 477/92, 94, 902, 182, 180, 174
See application file for complete search history.

(56) References Cited

U.S. PATENT DOCUMENTS

| 5,184,875 | A |   | 2/1993 | Wrede |
| 5,303,986 | A |   | 4/1994 | VanDeMotter et al. |
| 5,441,335 | A |   | 8/1995 | Stumpe et al. |
| 5,613,743 | A |   | 3/1997 | Kost et al. |
| 5,657,838 | A |   | 8/1997 | Vogelsang et al. |
| 5,816,665 | A | * | 10/1998 | Burnett et al. ................. 303/3 |
| 6,287,237 | B1 |  | 9/2001 | Graf et al. |
| 6,684,148 | B2 | * | 1/2004 | Chess .......................... 701/95 |

FOREIGN PATENT DOCUMENTS

EP    1520762 A2  *  4/2005

* cited by examiner

*Primary Examiner*—Devon C. Kramer
(74) *Attorney, Agent, or Firm*—Marshall & Melhorn LLC.

(57) ABSTRACT

A method and apparatus for a power dissipation management system for a vehicle where a thermal condition of a plurality of driveline components is determined. The quantity of energy for each driveline component can absorb is determined based upon its thermal condition. A braking signal to one or more of the driveline components is provided based upon the quantity of energy each component can absorb.

20 Claims, 6 Drawing Sheets

POWER DISSIPATION MANAGEMENT SYSTEM

RELATED APPLICATION

This application is claiming the benefit, under 35 U.S.C. §119(e), of the provisional application filed Nov. 20, 2002, under 35 U.S.C. §111(b), which was granted Ser. No. 60/427,812, and is hereby incorporated by reference.

FIELD OF THE INVENTION

The present invention relates to a power dissipation management system for vehicles having one or more braking devices.

BACKGROUND OF THE INVENTION

Various braking systems designed to dissipate the kinetic energy of a vehicle are known. One such system is described in U.S. Pat. No. 5,184,875 which provides for an electronically controlled braking system. A control unit receives a braking signal from the driver. The unit selects one or more brakes of the vehicle to obtain deceleration proportional to the braking signal. The vehicle has a friction service brake and a wear-free auxiliary brake such as a fluid brake, an eddy current brake or a motor brake. Preferably, the wear-free brake is triggered and, if the braking signal is significant enough, the friction-affected brake is triggered. The system has signal transducers to detect the condition (temperature, thickness, frequency of use) of the friction-affected brake and the vehicle speed. If the system detects a condition in the brakes which has lowered their coefficient of friction, the service brake is triggered exclusively to correct the condition. If, however, the system determines that additional use of the service brakes may overheat them, it triggers the auxiliary brake additionally or exclusively.

U.S. Pat. No. 5,303,986 provides for a braking system having both an electronic pneumatic braking system and a retarder which applies a retarding torque to the vehicle driveline. The invention relates to integrating a retarder control system with a control system for the pneumatically actuated brakes to distribute the braking required between the systems without jeopardizing the braking balance between the driven and non-driven wheels. A controller receives a braking signal from the vehicle operator, from an engine or exhaust brake, or from the operator controlled retarder switches, in addition to a signal from a vehicle load sensor. The controller also receives data from sensors on each wheel regarding the speed of each wheel. The controller generates output signals to the retarder, and the engine and/or exhaust brake. During normal operation, the retarder is switched on, either manually or automatically, every time a brake application is effected. The braking signal to the drive wheels is adjusted for the effects of the retarders so that the braking balance front to rear is maintained.

U.S. Pat. No. 5,441,335 provides for an electronically controlled motor vehicle brake. An electrical braking valve pick-up generates an electrical output signal (U) as a function of the actuation path of the brake pedal and is connected to an electronic control unit. A gradient, $\Delta U/\Delta t$, which represents a measure of the actuation rate of the braking value pick-up, is determined by the control unit from the variation with time of the output signal. If the gradient is above a limiting value, the unit recognizes rapid braking. The friction brake is engaged earlier and the auxiliary brake (e.g., engine brake, retarder, constant throttles) may not ever be engaged. If the gradient is below a minimum value, slow braking is present. The friction brake responds relatively late so that the slower auxiliary brake can respond first and absorb most or all of the braking need.

U.S. Pat. No. 5,613,743 provides for a method of controlling the slippage of driven wheels in a motor vehicle. Initially, a target braking torque for each of the respective driven wheels is determined. The torques are compared and the smallest of them is selected. A target engine torque is then determined from the smallest braking torque. The engine torque is adjusted to conform to the target engine torque. A residual braking torque for each wheel is calculated based upon the target engine torque and the respective target brake torques. The brake pressure at the driven wheels is varied so that the residual braking torques for each wheel are realized.

U.S. Pat. No. 5,657,838 provides for a method of operating a drive unit for a vehicle having an engine braking system. The unit has an engine, a gearbox and a retarder in a constant drive connection with the engine. The unit also has a cooling circuit where the coolant is the fluid for the retarder. The retarder acts as a pump for the cooling circuit. An overall braking output is measured and compared to a value. When the overall braking output is less than the value, the retarder is activated to deliver the required amount. When the braking output is more than the value, the engine braking system is activated along with the retarder. The retarder delivers the difference in braking between that provided by the engine braking system and required amount.

U.S. Pat. No. 5,816,665 provides for a retarder system for a drive train where the system is driven by a multi-cylinder engine via a transmission. The system has a compression brake adapted to operate in multiple stages to provide various degrees of braking to the engine. A fluid retarder, also adapted to operate in multiple stages to absorb power from the engine, is coupled for rotation with the vehicular drive train. Each stage of the retarder corresponds to a specific braking level output from the retarder. For example, stage one provides only a small amount of fluid to circulate within the retarder housing thus resulting in a small braking effect. Stage three, however, adds a predetermined amount of fluid to the retarder housing thus providing a larger braking effect. A controller is electrically connected to the compression brake and the fluid retarder to control them both to slow the speed of the vehicle.

U.S. Pat. No. 6,287,237 provides for a method of controlling a drive train including the steps of converting a braking signal from a brake petal into a braking torque. A setpoint value for an engine drag torque is determined based upon the braking torque. A downshift characteristic diagram is provided to determine a setpoint transmission ratio. The ratio is a function of the setpoint value for the engine drag torque and also of a variable functionally associated with the speed of the vehicle. The diagram has characteristic curves defined by taking into account a minimum engine torque. Lastly, a transmission ratio is automatically set by reference to the diagram.

The present invention has the advantage over the prior art by distributing the kinetic energy of the vehicle among various components of the hydrodynamic transmission based upon the actual thermal capacity of the component. Distributing the kinetic energy among the components of the transmission allows the size of the service brakes to be reduced and hence lowers their cost.

SUMMARY OF THE INVENTION

The present invention is directed toward a method and apparatus for a power dissipation management system for vehicles wherein the thermal condition for a plurality of driveline components is determined. Based upon the thermal condition of each driveline component, a quantity of energy each can accept is determined. A braking signal is provided to one or more of the driveline components based at least in part upon the quantity of energy the component can accept.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2 is a schematic of a component of the invention depicted in FIGS. 1 and 1a;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
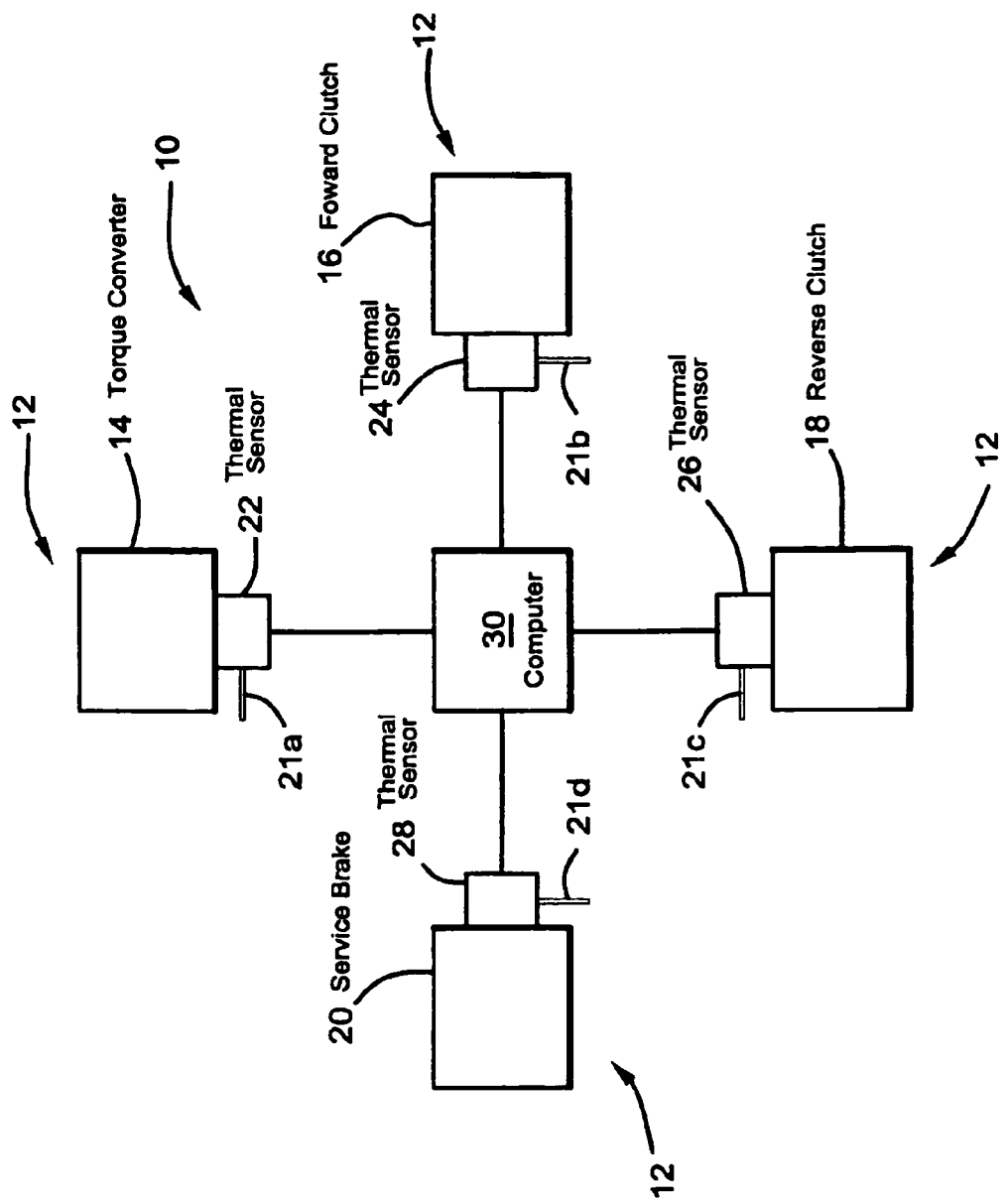
FIG. 1 is a schematic of an embodiment of the present invention.

FIG. 1 schematically represents a portion of a power dissipation management system 10 for a vehicle (not shown). The system 10 comprises a plurality of driveline components 12 comprising a torque converter 14, at least one forward clutch 16, at least one reverse clutch 18 and at least one service brake 20. Although the following will describe the invention in terms of a single forward and a single reverse clutch, those skilled in the art will readily appreciate that the present invention incorporates vehicles having more than one forward clutch and/or more than one reverse clutch or more than one clutching mechanism.

As known to those skilled in the art, coolant fluid, such as oil, is provided from at least one reservoir (not shown) through at least one fluid line 21a, 21b, 21c, and 21d to each of the components 14, 16, 18, and 20, respectively. In one embodiment, a thermal sensor is operatively connected to each fluid line for each component as shown in FIG. 1. Thus, the torque converter 14 has a thermal sensor 22, the forward clutch 16 has thermal sensor 24, the reverse clutch 18 has a thermal sensor 26, and the service brake 20 has a thermal sensor 28. The thermal sensors 22, 24, 26, 28 sense the temperature of the fluid entering each component 14, 16, 18, and 20, respectively. Each thermal sensor 22, 24, 26, 28 is connected to a computer 30 to provide the computer 30 with each sensed temperature.

Figure 1A:
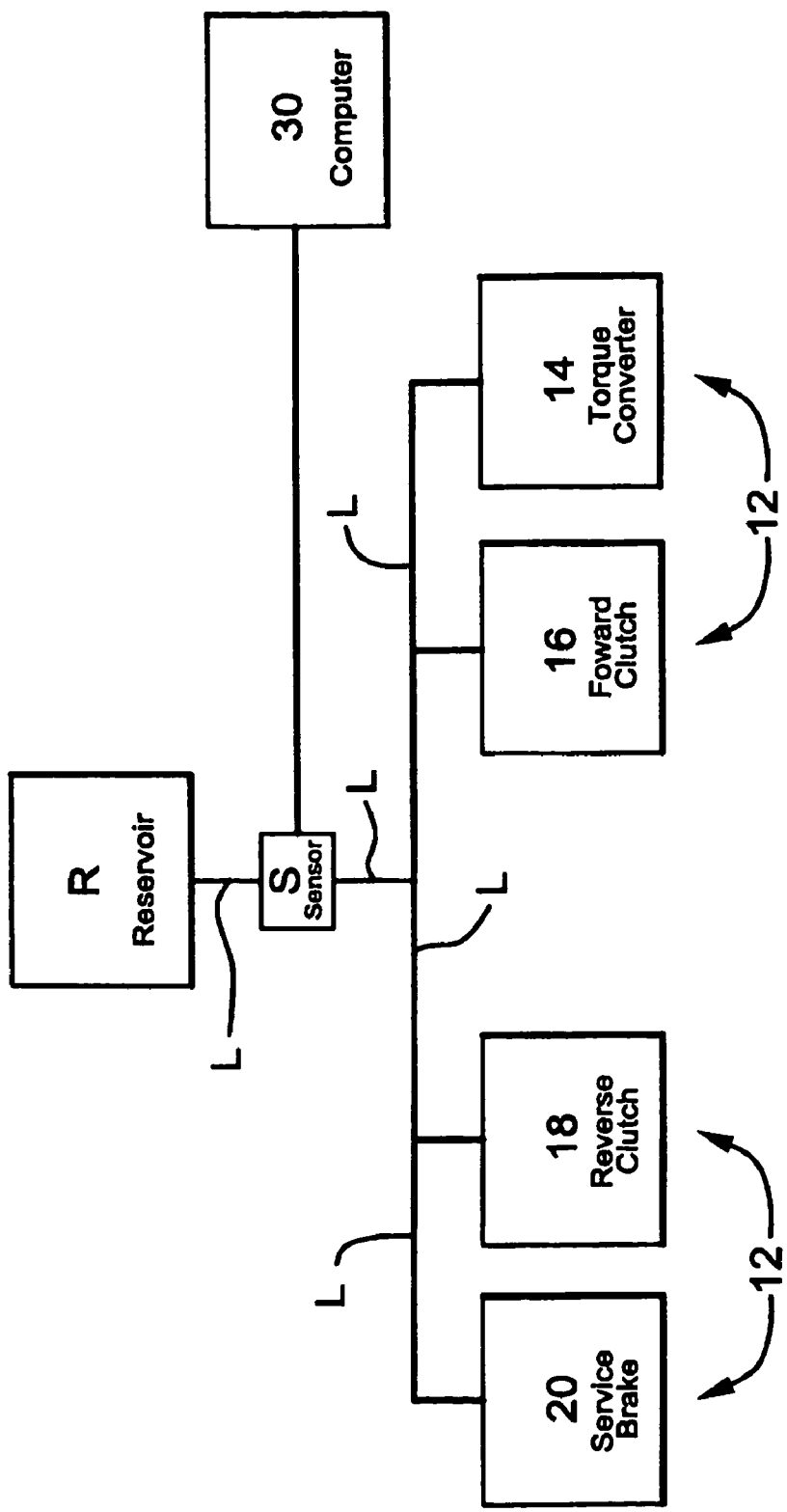
FIG. 1a is a schematic of another embodiment of the present invention.

In another embodiment schematically depicted in FIG. 1a, the coolant fluid is provided from a single reservoir R through coolant lines L to the components 14, 16, 18 and 20. In this embodiment, only a single sensor S senses the temperature of the entering coolant fluid. Sensor S provides the computer 30 with the sensed temperature.

Figure 2:
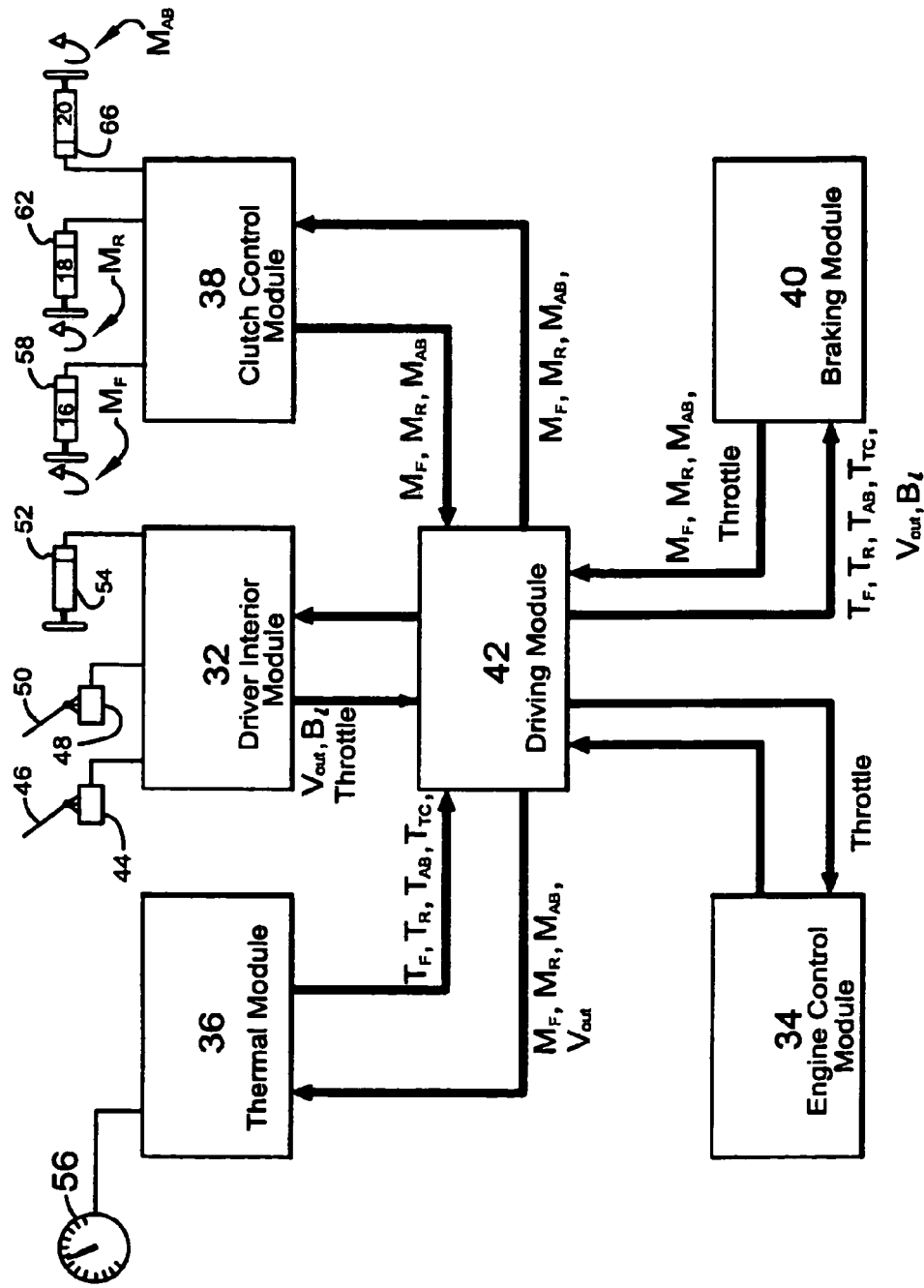

As schematically depicted in FIG. 2, the computer 30 is comprised of a plurality of modules including a driver intention module 32, an engine control module 34, a thermal module 36, a clutch control module 38 and a braking module 40. Preferably, each of the above modules 32, 34, 36, 38 and 40 are connected to a driving module 42.

The term module is used to describe functions of the computer 30, as will be discussed in detail below. The modules 32, 34, 36, 38, 40, 42 may be combined with one another in any combination, or they may exist individually, as depicted in FIG. 2. Alternatively, the modules 32, 34, 36, 38, 40, 42 may be physically combined in a single computer 30. Regardless of the embodiment, the computer 30 can execute one or more of the modules 32, 34, 36, 38, 40, 42 in any order or sequence, including simultaneously.

As schematically depicted in FIG. 2, the driver intention module 32 is connected to a sensor 44 on an accelerator pedal 46, a sensor 48 on a brake pedal 50 and it may also be connected to one or more sensors 52 on hydraulic controls 54 for the vehicle. The hydraulic controls 54 may be used for auxiliary vehicle hydraulic systems (not shown) as known to those skilled in the art. The desired acceleration $V_{out}$, based upon the sensed position of the accelerator pedal 46, or the desired deceleration $B_i$, based upon the sensed position of the brake pedal 50, is received by the driver intention module 32 and sent to the driving module 42. The sensed position of the hydraulic controls 54 may be similarly received and sent.

The driver intention module 32 also comprises a speed sensor 55 for measuring the speed of the vehicle $V_M$. $V_M$ is sent to driving module 42.

The engine control module 34 measures the actual revolutions per minute of the engine in any manner known to those skilled in the art. The measured engine speed is transferred from the engine control module 34 to the driving module 42.

In a preferred embodiment, the clutch control module 38 is connected to at least one sensor 58 for sensing a forward clutch torque $M_F$ of the forward clutch 16, at least one sensor 62 for sensing a reverse clutch torque $M_R$ of the reverse clutch 18, and at least one sensor 66 for sensing a service brake torque $M_{AB}$ of the service brake 20. Each of these sensors 58, 62, 66 communicates some or all of the torques $M_F$, $M_R$, $M_{AB}$ to the clutch control module 38 which in turn communicates them to the driving module 42.

If, for any reason, some or all of the torques $M_F$, $M_R$, $M_{AB}$ cannot be sensed, the torque $M_F$, $M_R$, and/or $M_{AB}$ is assumed to be equal to the desired clutch torque for that component. The desired clutch torque is determined by the braking module 40 and provided to modules 38 and 42. The desired clutch torque is proportional to the amount of braking desired.

In the process of using the present invention, the sensed position of the brake pedal 50, the sensed position of the accelerator pedal 46 and the sensed positions of the vehicle hydraulic controls 54 (if any) are provided to the driver intention module 32. The driver intention module 32 determines the desired acceleration $V_{out}$, the desired deceleration $B_i$ and/or the desired engine speed (throttle) of the vehicle based upon the respectively sensed positions stated above. The desired acceleration $V_{out}$, the desired deceleration $B_i$, the desired engine speed of the vehicle (throttle) and/or $V_M$ are sent to the driving module 42 from the driver intention module 32. The driving module 42 signals the engine control module 34 of the desired engine speed through a throttle signal and the engine control module 34 maintains the engine at that speed.

By way of a first example, if the sensor 44 on the accelerator pedal 46 determines the accelerator pedal 46 is being deflected, the vehicle operator likely wants the vehicle to accelerate. In that case, the driver intention module 32 signals the driving module 42 that no braking through the driveline components 12, as described in more detail below, is requested.

By way of a second example, if the sensors 52 on the vehicle hydraulic controls 54 senses that the controls 54 have been engaged, the driver likely wants to use the auxiliary systems on the vehicle. In that case, the driver intention module 32 signals the driving module 42 that no braking through the driveline components 12, as described below, is requested.

The thermal module 36 uses a plurality of inputs to calculate a forward clutch temperature $T_F$, a reverse clutch temperature $T_R$, a service brake temperature $T_{AB}$, and/or a torque converter temperature $T_{TC}$. The inputs are provided from the driving module 42 and preferably comprise a power dissipated in the forward clutch $P_F$, a power dissipated in the reverse clutch $P_R$, a power dissipated in the torque converter $P_{TC}$, and a power dissipated in the service brake $P_{AB}$.

The power dissipated values $P_F$, $P_R$, and $P_{AB}$ are calculated from $V_M$, the gear ratios of the vehicle transmission, the engine speed and the clutch torques $M_F$, $M_R$, and $M_{AB}$, respectively. As known to those skilled in the art, the gear ratios of the vehicle transmission vary from transmission to transmission. Preferably, information on the gear ratio for a particular transmission is provided to the driving module 42 as a configuration file. Those skilled in the art know that for each power dissipation calculation for each clutch, the power dissipated is the product of the speed difference over that clutch and the torque flowing through that clutch.

A power dissipated in the torque convert $P_{TC}$ is calculated from $V_M$, the gear ratios of the vehicle transmission, the engine speed and the characteristics of the torque converter. Those skilled in the art know that the power dissipated is determined from standard tables using the engine speed and the turbine speed.

The inputs also include the entering coolant fluid temperature as determined from the thermal sensors 22, 24, 26 and 28 for each respective component or thermal sensor S. Each temperature $T_F$, $T_R$, $T_{AB}$, and $T_{TC}$ is calculated using the respective sensed cooling fluid entering temperature, or the cooling fluid entering temperature from sensor S, and by knowing the thermal properties of each component 14, 16, 18 and 20. Those skilled in the art know that the thermal properties of the components 14, 16, 18 and 20 comprise the thermal mass of the component, the coolant flow through the component, the amount of heat dissipated in the component and the geometry of the component.

In an alternative embodiment to that describe above, those skilled in the art will readily appreciate that the temperature of each component $T_F$, $T_R$, $T_{AB}$, and $T_{TC}$ can be directly measured from the respective component.

Regardless of which of the above methods is used to determine $T_F$, $T_R$, $T_{AB}$, and $T_{TC}$, preferably, each of these temperatures $T_F$, $T_R$, $T_{AB}$, $T_{TC}$ are communicated to the driving module 42.

Figure 3:
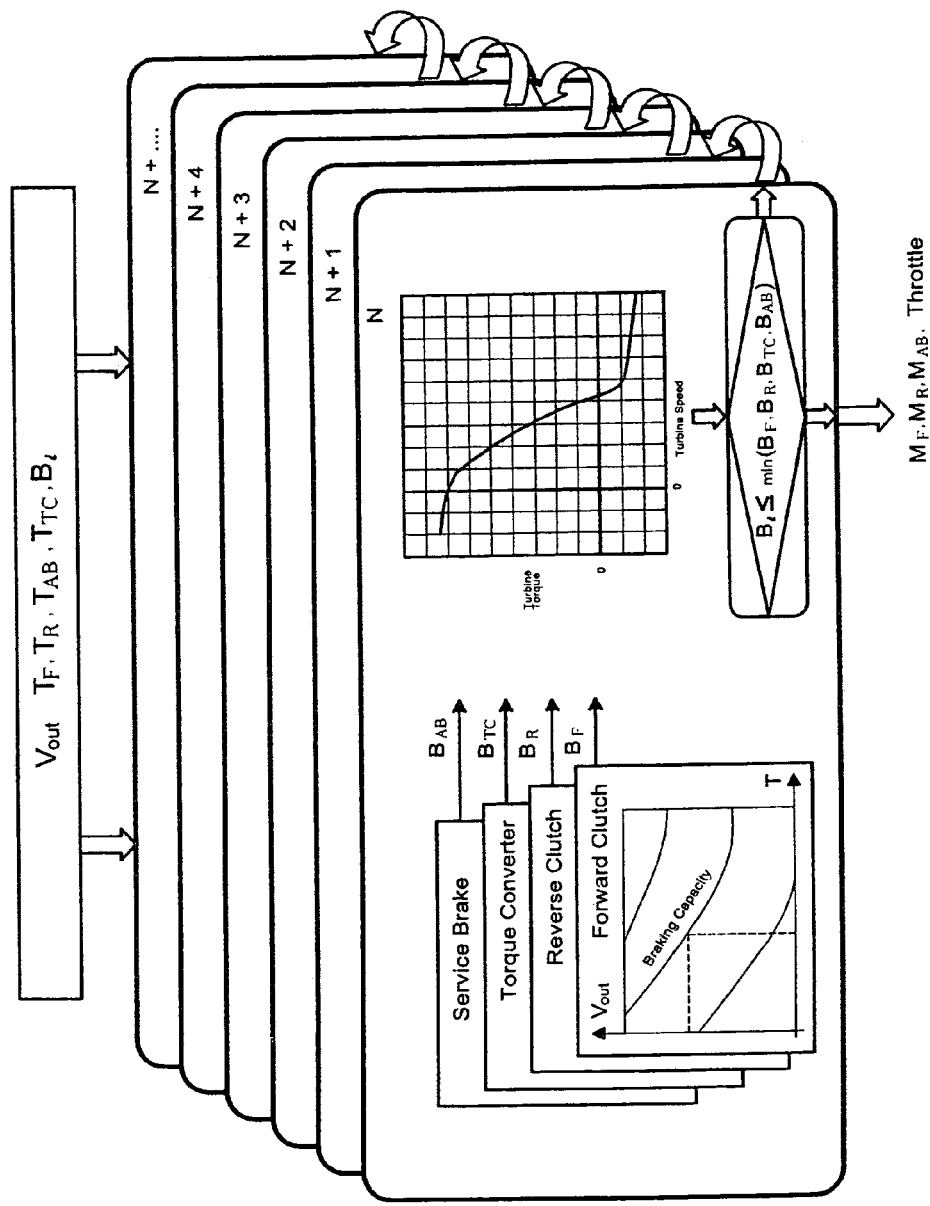
FIG. 3 is a flow chart depicting a step sequence of the present invention.

As depicted in FIGS. 2 and 3, the braking module 40 receives as inputs the forward clutch temperature $T_F$, the reverse clutch temperature $T_R$, the service brake temperature $T_{AB}$, the torque converter temperature $T_{TC}$, the desired acceleration $V_{out}$ and the deceleration value $B_i$. The braking module 40 determines the amount of energy the forward clutch 16, the reverse clutch 18, the service brake 20 and the torque converter 14 can safely accept based upon the above inputs. The braking module 40 then compares the amount of energy each of the above components 14, 16, 18, 20 can accept with a plurality of braking profiles 64. The braking profiles are depicted as N, N+1, . . . N+ . . . in FIG. 3. If the amount of energy available in any of the above components 14, 16, 18, 20 is less than the braking energy called for in a braking profile 78 for any component 14, 16, 18, 20 then another braking profile 64 is selected. The amount of energy called for in a braking profile 64 for the forward clutch is $B_F$, for the reverse clutch is $B_R$, for the torque converter is $B_{TC}$ and for the service brake is $B_{AB}$. The braking profiles 64 are provided to the braking module 40 in order of highest braking efficiency for the vehicle to lowest braking efficiency.

A braking profile 64 is selected that does not require more than, or is at least equal to, the braking energy that the forward clutch 16, the reverse clutch 18, the service brake 20 and/or the torque converter 14 can accept. It is within the scope of the present invention that some profiles do not require braking on each drivetrain component.

The selected braking profile 64 converts the forward clutch temperature $T_F$, the reverse clutch temperature $T_R$, the service brake temperature $T_{AB}$, the torque converter temperature $T_{TC}$, the desired acceleration $V_{out}$ and the deceleration $B_i$ value into one or more of the following: a forward clutch torque $M_F$, a reverse clutch torque $M_R$, a service brake torque $M_{AB}$ and/or a throttle setting (throttle).

Some or all of the torques $M_F$, $M_R$, $M_{AB}$ are communicated to the clutch control module 38 where they are converted to one or more of a forward clutch fluid pressure, a reverse clutch fluid pressure, a torque converter pressure and/or a service brake pressure. The pressures are communicated to their respective components in a manner known to those skilled in the art. Similarly, the throttle setting (throttle) is communicated to the engine control module 34 where it is converted to a torque converter pressure to the torque converter.

Figure 4:
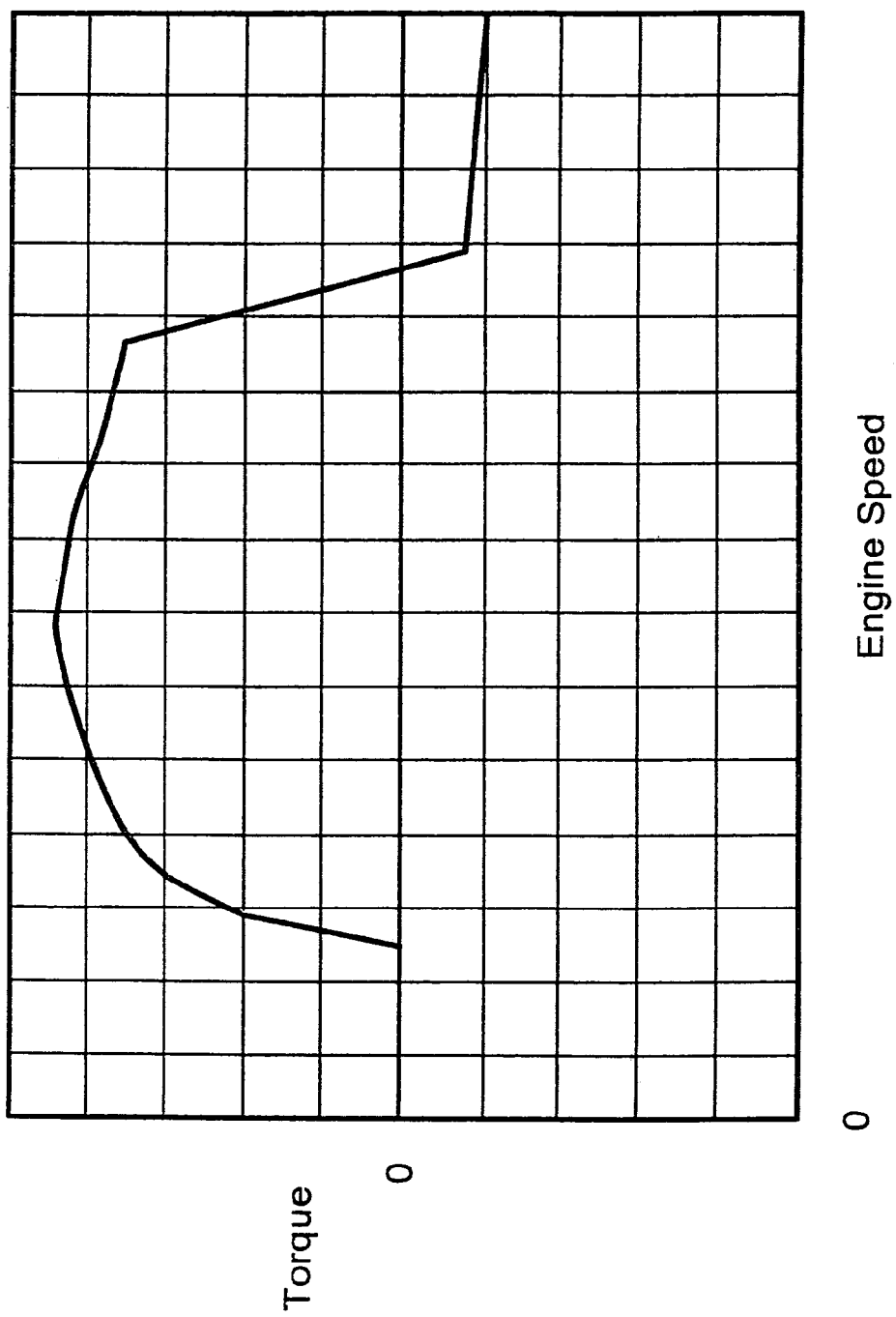
FIG. 4 is a chart of torque against engine speed.

The following braking profiles are provided in no particular order of preference, but are provided as examples of preferred embodiments of the present invention. A first braking profile has no thermal limitations, however, the engine must be operating at a minimum revolutions per minute, often the idle speed of the motor. In this profile, the engine is used to brake the driveline by decreasing the throttle. The engine speed decreases and the torque converter 14 provides torque to the driveline in the opposite direction of its rotation to slow the vehicle as known to those skilled in the art. The maximum braking torque depends in part upon the engine speed and is higher for the higher engine speeds of the vehicle as shown in FIG. 4.

A second braking profile decreases the engine speed, as provided above, to engage the torque converter 14 as a brake on the driveline. The operator may prevent the engine speed from decreasing beyond a set point to keep engine driven components provided with sufficient power. Initially, fluid pressure is increased to the reverse clutch 18 while the forward clutch 16 is kept under full pressure. The reverse clutch 18 slips and transfers torque through the forward clutch 16, thus braking the driveline.

As known to those skilled in the art, once the engine drops below a certain limit determined by the engine speed, the torque converter 14 will begin to drive the driveline. At that moment, the forward clutch 16 is completely opened, thus preventing the torque converter 14 from providing energy to the driveline. The reverse clutch 18 continues to absorb energy from the driveline, thus slowing it down further.

A third braking profile increases fluid pressure to just the reverse clutch 18 or both the reverse clutch 18 and the forward clutch 16 in any proportion. For example, the desired braking may be 100% in the reverse clutch 18, 80% in the reverse clutch 18 and 20% in the forward clutch 16, 50% in the reverse clutch 18 and 50% in the forward clutch 16 or 20% in the reverse clutch 18 and 80% in the forward clutch 16. Naturally, other proportions of reverse 18 and forward clutch 16 braking are well within the scope of the present invention.

Under this third braking profile, the torque converter 14 can be put into at least three different modes by closed loop controlling the throttle and the torque flow through the clutches 16, 18 or in an open loop system as known by those skilled in the art. The three modes of the torque converter 14 include (a) counter rotation mode, (b) normal mode, and (c) braking mode. These three modes are graphically depicted in FIG. 5.

Figure 5:
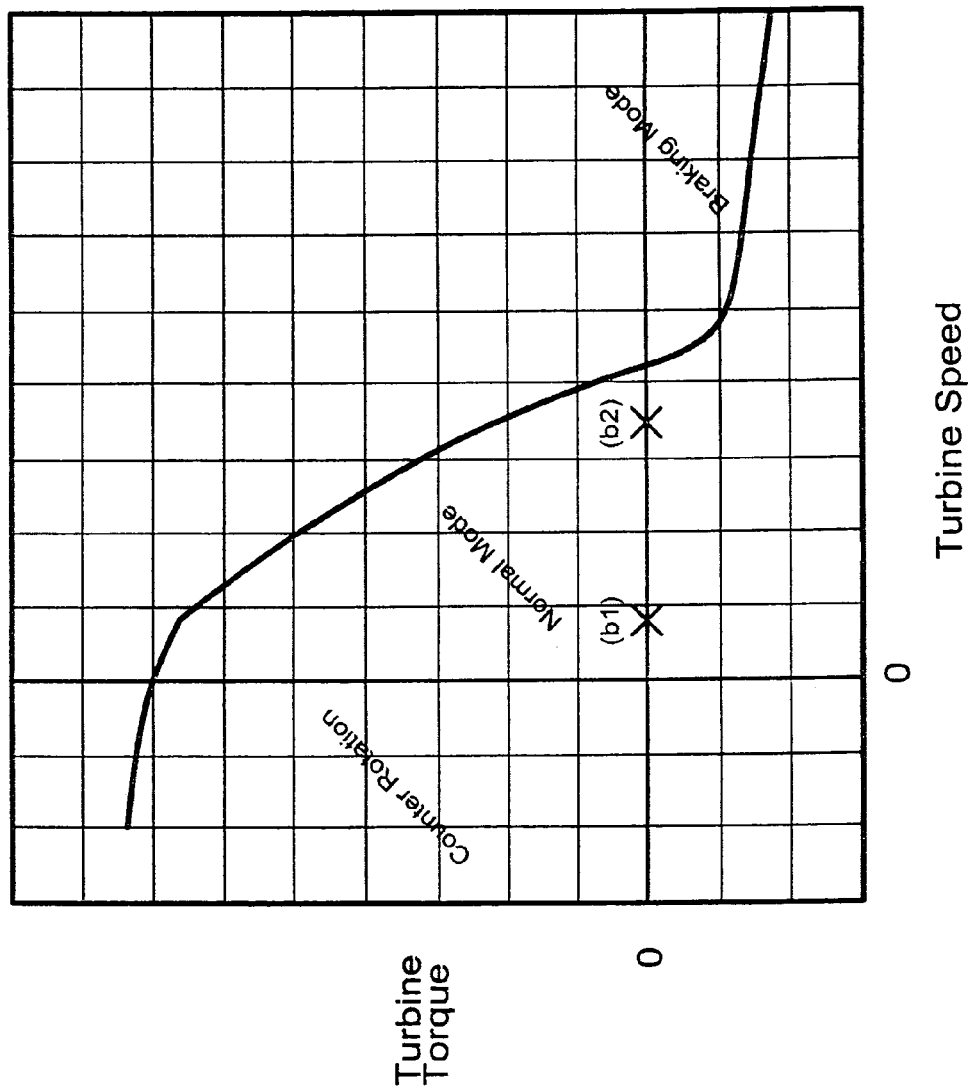
FIG. 5 is a chart of turbine torque against turbine speed.

As seen in FIG. 5, during counter rotation mode the turbine torque is high and the turbine speed is low and slightly negative, thus the torque converter 14 is taking away energy from the drivetrain and helping in braking. In this mode, those skilled in the art will appreciate that the forward clutch 16 is stressed much more than the reverse clutch 18 to assist in braking.

In normal mode, there are two zones b1 (high turbine torque and low turbine speed) and b2 (low turbine torque and high turbine speed) that can be used for driveline braking. However, other than these two zones it is preferred that this mode is avoided. In these zones, both the reverse 18 and forward clutches 16 can be slipped in various proportions as mentioned above.

In zone b1, the differential speed of the forward clutch 16 and the reverse clutch 18 are more or less equal. Thus, the forward clutch 16 is stressed more or less equally as the reverse clutch 18.

In zone b2, the differential speed of the forward clutch 16 is low and the differential speed of the reverse clutch 18 is high. Thus, the reverse clutch 18 is stressed more than the forward clutch 16 to assist in braking.

In the braking mode, also depicted in FIG. 5, the turbine torque is low and negative and the turbine speed is high. The differential speed of the forward clutch 16 is low, but the differential speed of the reverse clutch 18 is high. Thus, the reverse clutch 18 is stressed much more than the forward clutch 16 to assist in braking.

Entering into any of the above-described modes depends upon the amount of energy the forward 16 and the reverse 18 clutches can accept. When the reverse clutch 18 cannot accept additional energy, the energy is stored in the forward clutch 16 and vice versa. If neither clutch 16, 18 can accept any additional energy, the braking module will move to the next braking profile.

A fourth braking profile can be used if neither the forward 16 or the reverse 18 clutches can accept any additional energy or the amount of braking the forward 16 and/or the reverse 18 clutches can accept is not sufficient. In this braking profile, the service brakes 20 are engaged to provide the additional amount of braking required.

In accordance with the provisions of the patent statutes, the present invention has been described in what is considered to represent its preferred embodiments. However, it should be noted that the invention can be practiced otherwise than as specifically illustrated and described without departing from its spirit or scope.

We claim:

1. A power dissipation management system for a vehicle, comprising:
   a. a plurality of driveline components comprising a torque converter, at least one forward clutch, at least one reverse clutch and at least one service brake of a vehicle;
   b. at least one thermal sensor for sensing a fluid input temperature of each of said driveline components; and
   c. a computer for providing at least one braking signal to one or more of said driveline components based at least in part upon a determined quantity of braking available in each of said driveline components based at least in part on a calculated thermal condition of each of said driveline components.

2. The system of claim 1, wherein said computer comprises a driver intention module, an engine control module, a thermal module, a clutch control module, and a braking module all in communication with a driving module.

3. The system of claim 1, wherein said computer selects a braking profile where the braking on any driveline component within said profile does not exceed said determined quantity of braking available in any driveline component.

4. The system of claim 3, wherein said determined quantity of braking available in each of said driveline components is compared with a plurality of braking profiles provided to said computer in a pre-determined order of preference.

5. The system of claim 1, wherein said calculated thermal condition for each of said drive line components is based at least in part on a sensed fluid input temperature for each of said driveline components and a torque is determined for each of said driveline components.

6. A method of dissipating power in a vehicle, comprising:
   a. determining a thermal condition of a plurality of driveline components, said driveline components comprising a torque converter, at least one forward clutch, at least one reverse clutch and at least one service brake of a vehicle;
   b. determining a quantity of energy that one or more of said driveline components can absorb based upon said thermal condition of each;
   c. providing a braking signal to one or more of said driveline components based at least in part upon said quantity of energy one or more of said driveline components can absorb; and
   d. braking said vehicle via said one or more of said driveline components.

7. The method of claim 6, further comprising providing a driver intention module, an engine control module, a thermal module, a clutch control module and a braking module all in communication with a driving module.

8. The method of claim 7, wherein said braking module is provided with a temperature of said forward clutch, a temperature of said reverse clutch, a temperature of said torque converter and a temperature of said at least one service brake and a first engine speed value and a desired deceleration value.

9. The method of claim 8, wherein said braking module determines an amount of braking energy available in said torque converter, said at least one forward clutch, said at least one reverse clutch and said at least one service brake.

10. The method of claim 9, wherein said braking module compares said amount of braking energy available in said torque converter, said at least one forward clutch, said at least one reverse clutch and said at least one service brake with a plurality of braking profiles.

11. The method of claim 10, wherein if said amount of braking energy available in said torque converter, said at least one forward clutch, said at least one reverse clutch or said at least one service brake is less than the braking energy required by a braking profile, then another braking profile is selected.

12. The method of claim 11, wherein said braking profiles are provided to said braking module in order of highest braking efficiency for said vehicle to lowest braking efficiency.

13. The method of claim 12, wherein a braking profile is selected in which said amount of braking energy available in said torque converter, said at least one forward clutch, said at least one reverse clutch or said at least one service brake is less than or equal to the amount of braking energy required for said torque converter, said forward clutch, said reverse clutch, or said service brake, respectively, in said braking profile.

14. The method of claim 13, wherein said braking profile that does not require more energy available in said torque converter, said forward clutch, said reverse clutch or said service brake provides one or more of a forward clutch torque, a reverse clutch torque, a service brake torque or a throttle setting.

15. The method of claim 14, wherein a first braking profile provides a second engine speed value less than said first engine speed value.

16. The method of claim 14, wherein a second braking profile applies a reverse clutch fluid pressure to said reverse clutch.

17. The method of claim 16, wherein a third braking profile applies said reverse clutch fluid pressure to said reverse clutch and selectively applies a forward clutch fluid pressure to said forward clutch.

18. The method of claim 17, wherein a fourth braking profile applies said reverse clutch fluid pressure to said reverse clutch and said forward clutch fluid pressure to said forward clutch and a service brake fluid pressure to said service brake.

19. The method of claim 6, wherein said thermal condition for each of said driveline components is based at least in part on a sensed fluid input temperature for each component and a torque determined for that component.

20. A method for a power dissipation management system for a vehicle, comprising:
   a. calculating a thermal condition of one or more driveline components, wherein said driveline components comprise a torque converter, at least one forward clutch, at least one reverse clutch and at least one service brake of a vehicle;
   b. calculating a quantity of energy each of said driveline components can absorb based at least in part upon said thermal condition of said one or more driveline components;
   c. comparing each of said quantities of energy said driveline components can absorb with a plurality of braking profiles;
   d. selecting a braking profile to engage one or more of said driveline components, wherein said selected braking profile does not require any of said driveline components to accept more energy than said components can absorb.

* * * * *